(12) United States Patent
Kodera et al.

(10) Patent No.: US 6,929,490 B2
(45) Date of Patent: Aug. 16, 2005

(54) CARD CONNECTOR HAVING AN EJECT LEVER WITH A SWINGABLE LOCKING MEMBER MOUNTED THERETO

(75) Inventors: Masafumi Kodera, Akishima (JP); Joe Motojima, Akishima (JP); Akira Natori, Fussa (JP); Keiichiro Suzuki, Kodaira (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/741,079

(22) Filed: Dec. 19, 2003

(65) Prior Publication Data

US 2004/0266237 A1 Dec. 30, 2004

(30) Foreign Application Priority Data

Dec. 26, 2002 (JP) .................................... 2002/377759

(51) Int. Cl.[7] ............................................. H01R 13/62
(52) U.S. Cl. ..................... 439/159; 439/325; 439/327
(58) Field of Search .............................. 439/159, 160, 439/157, 325, 327, 328, 630

(56) References Cited

U.S. PATENT DOCUMENTS

| | | | | |
|---|---|---|---|---|
| 6,089,891 A | * | 7/2000 | Nishioka | 439/159 |
| 6,270,365 B1 | * | 8/2001 | Nishioka | 439/159 |
| 6,572,392 B2 | * | 6/2003 | Motojima | 439/159 |
| 6,579,108 B1 | * | 6/2003 | Goff | 439/131 |
| 6,655,972 B2 | * | 12/2003 | Sato | 439/159 |
| 6,719,589 B2 | * | 4/2004 | Nishio et al. | 439/630 |
| 6,729,892 B2 | * | 5/2004 | Takada et al. | 439/159 |
| 6,761,569 B2 | * | 7/2004 | Nakamura | 439/159 |
| 6,776,632 B2 | * | 8/2004 | Kikuchi et al. | 439/159 |
| 6,776,640 B2 | * | 8/2004 | Nishioka | 439/325 |
| 6,796,816 B2 | * | 9/2004 | He | 439/159 |
| 6,802,726 B2 | * | 10/2004 | Chang | 439/159 |
| 6,817,874 B2 | * | 11/2004 | Okabe | 439/157 |

FOREIGN PATENT DOCUMENTS

| | | |
|---|---|---|
| JP | 2001 203034 | 7/2001 |
| JP | 2001 217035 | 8/2001 |
| JP | 2001-326028 | 11/2001 |
| JP | 2002-184525 | 6/2002 |
| JP | 2002 270287 | 9/2002 |
| JP | 2003 077588 | 3/2003 |

* cited by examiner

*Primary Examiner*—Gary Paumen
(74) *Attorney, Agent, or Firm*—Collard & Roe, P.C.

(57) ABSTRACT

A housing (1) is provided with an eject lever (3) for ejecting a card (10). The eject lever holds a locking member (4) to be swingable around a support shaft (13). The housing is provided with a cam portion (7). The locking member is provided with a cam follower portion (14) to be engaged with the cam portion and a locking portion (15) for locking the card to inhibit the release of the card. When the eject lever is made to perform sliding movement, the cam portion and the cam follower portion cooperate to swing the locking member so that the card is locked and unlocked by the locking portion.

9 Claims, 7 Drawing Sheets

CARD CONNECTOR HAVING AN EJECT LEVER WITH A SWINGABLE LOCKING MEMBER MOUNTED THERETO

The invention claims priority to prior Japanese application JP 2002-377759, the disclosure of which is incorporated herein by reference.

BACKGROUND OF THE INVENTION

This invention relates to a card connector to be connected to a card, such as an IC card and a communication card, and, in particular, to a card connector having a locking mechanism for preventing accidental release of a card.

Generally, a card connector has an eject mechanism for ejecting a card. For example, an eject mechanism called a W-PUSH type or a push—push type is known. The eject mechanism of this type has an eject lever to be moved within the connector together with the card inserted in the connector.

A structure in which the eject lever holds a locking member as a part of a locking mechanism for preventing accidental escape of the card from the card connector has been proposed, for example in Japanese Patent Application Publication No. 2001-326028. In this structure, the locking member is press-fitted to and held by the eject lever in a cantilevered fashion. Elastic deformation of the locking member moves a locking tab to lock the card and unlock the card.

Another known locking mechanism has a locking member rotatable around a rotation axis (for example, see Japanese Patent Application Publications (JP-A) Nos. 2002-184525 and 2001-203034).

If the card connector is to be small in size, the eject lever must also be small. However, such an eject lever is disadvantageous because it is not rigid enough to support or withstand a moment during deformation of the locking member. In particular, in the structure in which the locking member is press-fitted to and held by the eject lever in a cantilevered fashion as disclosed in JP-A 2001-326028, the mechanical strength is insufficient in practical use.

SUMMARY OF THE INVENTION

It is therefore an object of the present invention to provide a card connector with a locking mechanism high in durability even if the eject lever is reduced in size.

Other objects of the present invention will become clear as the description proceeds.

According to an aspect of the present invention, the card connector for use in connecting a card comprises a housing defining a card receiving area and having a cam portion, an eject lever slidably held by the housing and adapted to eject the card receiving area, a support shaft coupled to the eject lever, and a locking member mounted to the eject lever to be swingable around the support shaft. The locking member has a cam follower portion to be engaged with the cam portion and a locking portion for locking the card to inhibit the release of the card.

DESCRIPTION OF THE PREFERRED EMBODIMENT

Figure 1:
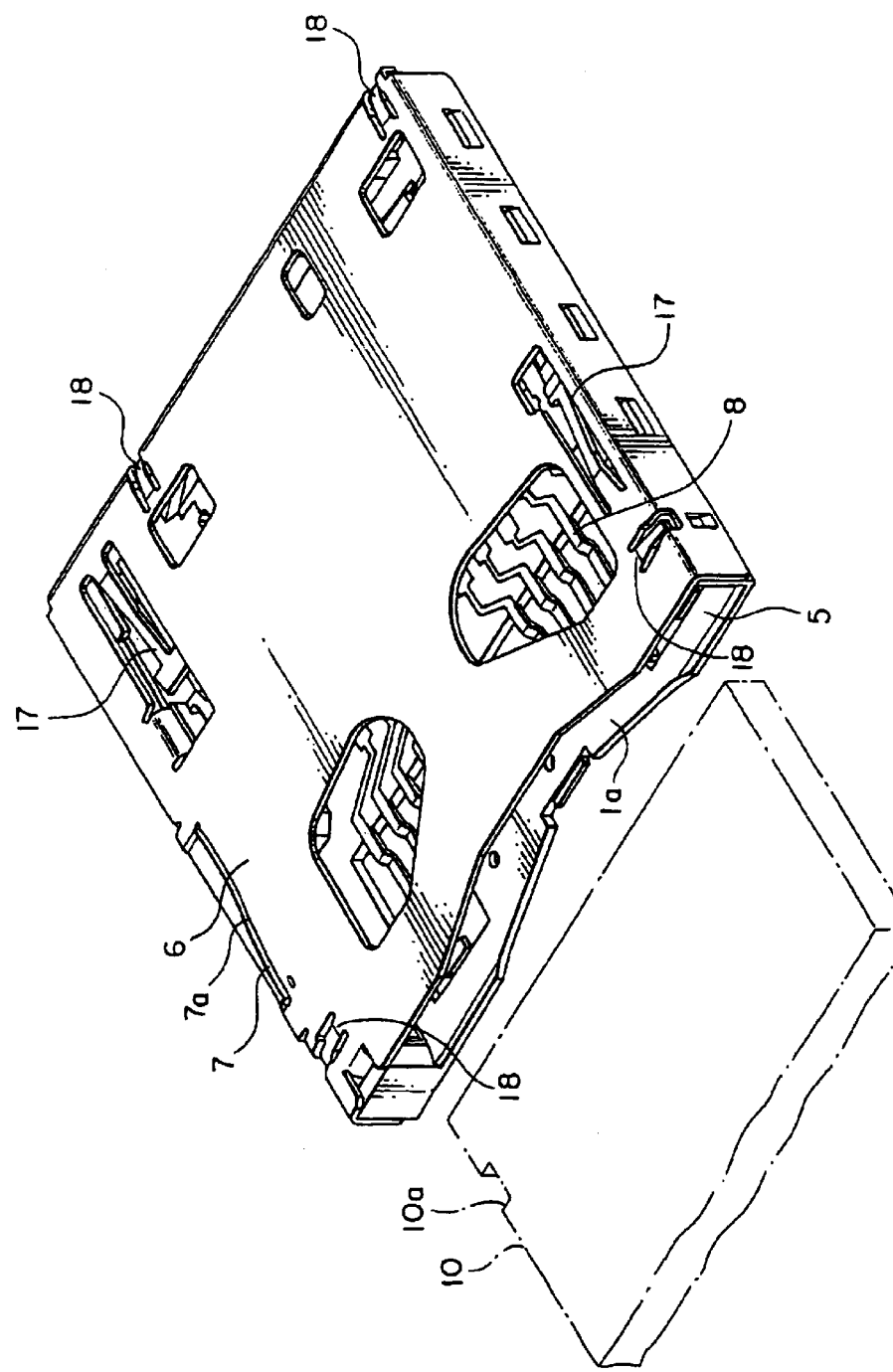
FIG. 1 is a perspective view of a card connector according to an preferred embodiment of the present invention.
Figure 2:
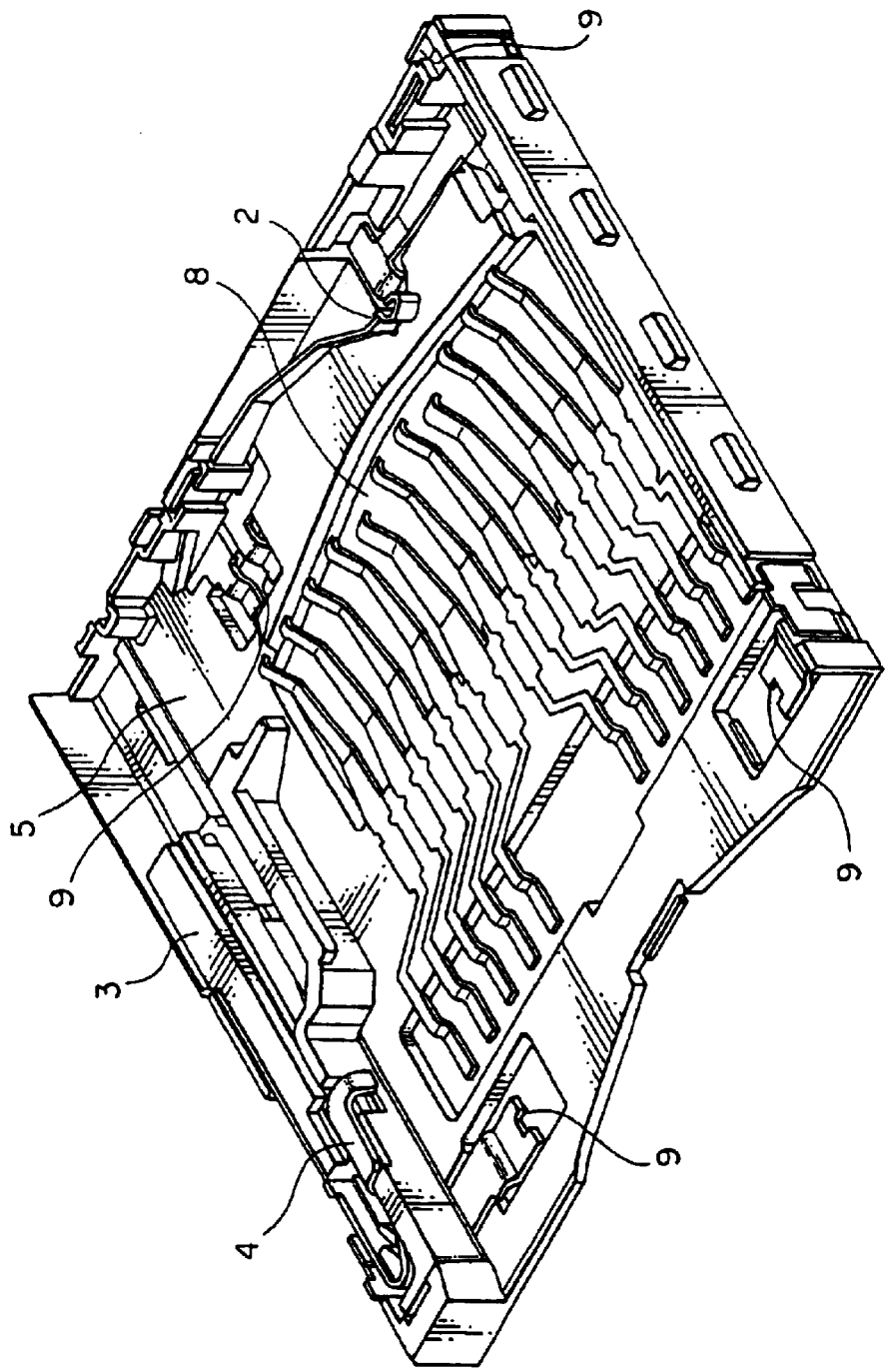
FIG. 2 is a perspective view of the card connector illustrated in FIG. 1, with the cover removed.
Figure 3:
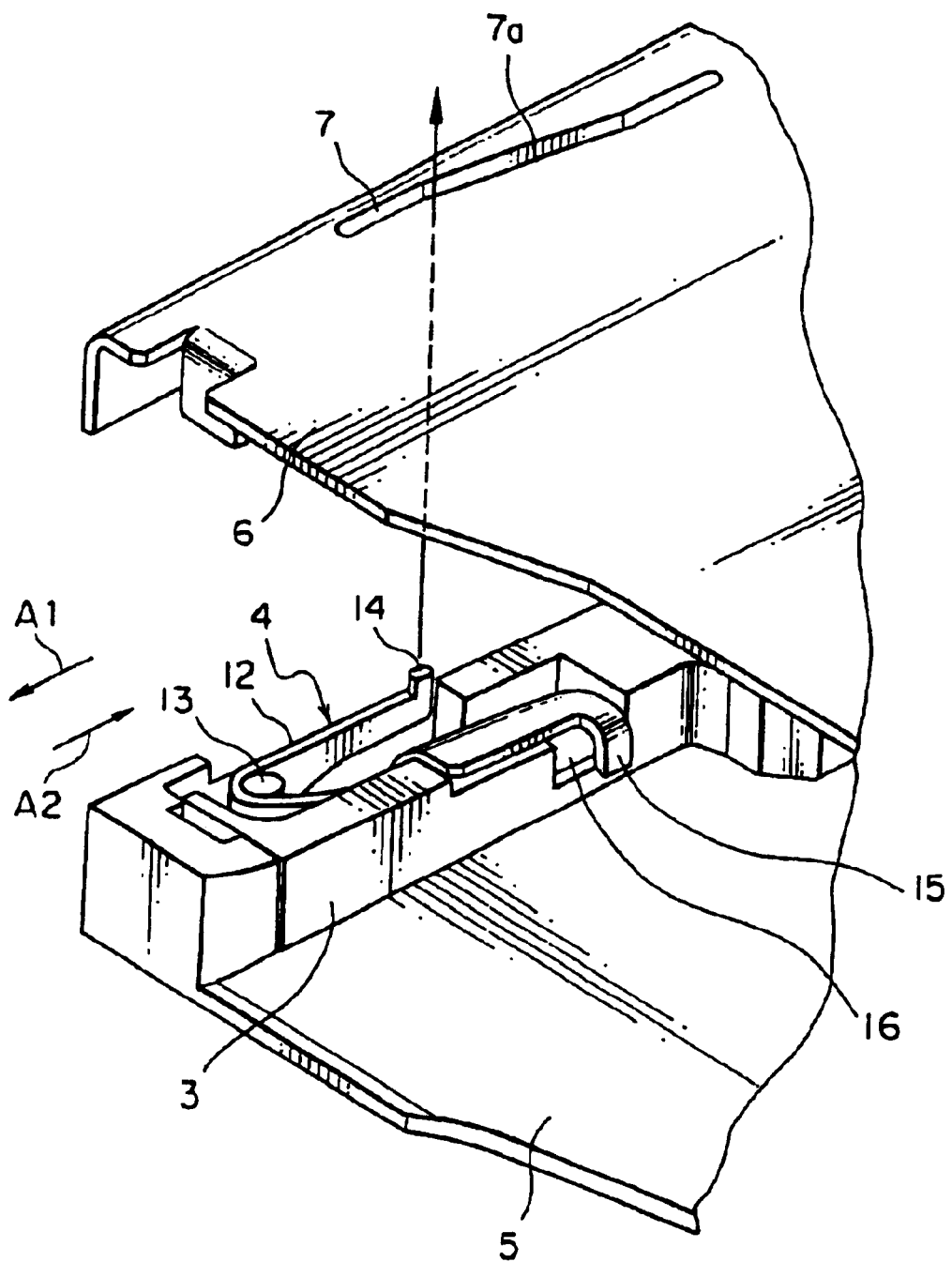
FIG. 3 is an exploded perspective view of a part of the card connector illustrated in FIG. 1.

Referring to FIGS. 1 through 3, the card connector is to be connected to a card 10, such as an IC card and a communication card, and comprises a case or a housing 1 defining a card receiving area 1a for receiving the card 10, a detection switch 2 disposed at one end of the housing 1 to detect insertion of the card 10, an eject lever 3 held by the housing 1 to be reciprocally slidable in first and second directions A1 and A2 and adapted to eject the card 10 from the card receiving area 1a, and a locking member 3 swingably held by the eject lever 3.

The housing 1 has an insulating base 5 and a cover 6 fixed to the base 5. Between the base 5 and the cover 6, the card receiving area 1a is defined. The eject lever 3 is held by the base 5. The cover 6 is provided with a cam portion 7. The cam portion 7 has an inclined intermediate part 7a inclined with respect to the first and the second directions A1 and A2.

The base 5 is provided with a plurality of conductive contacts 8 to be electrically connected to the card 10 inserted into the card receiving area 1a of the housing 1, and a plurality of conductive hold-downs 9.

Figure 4:
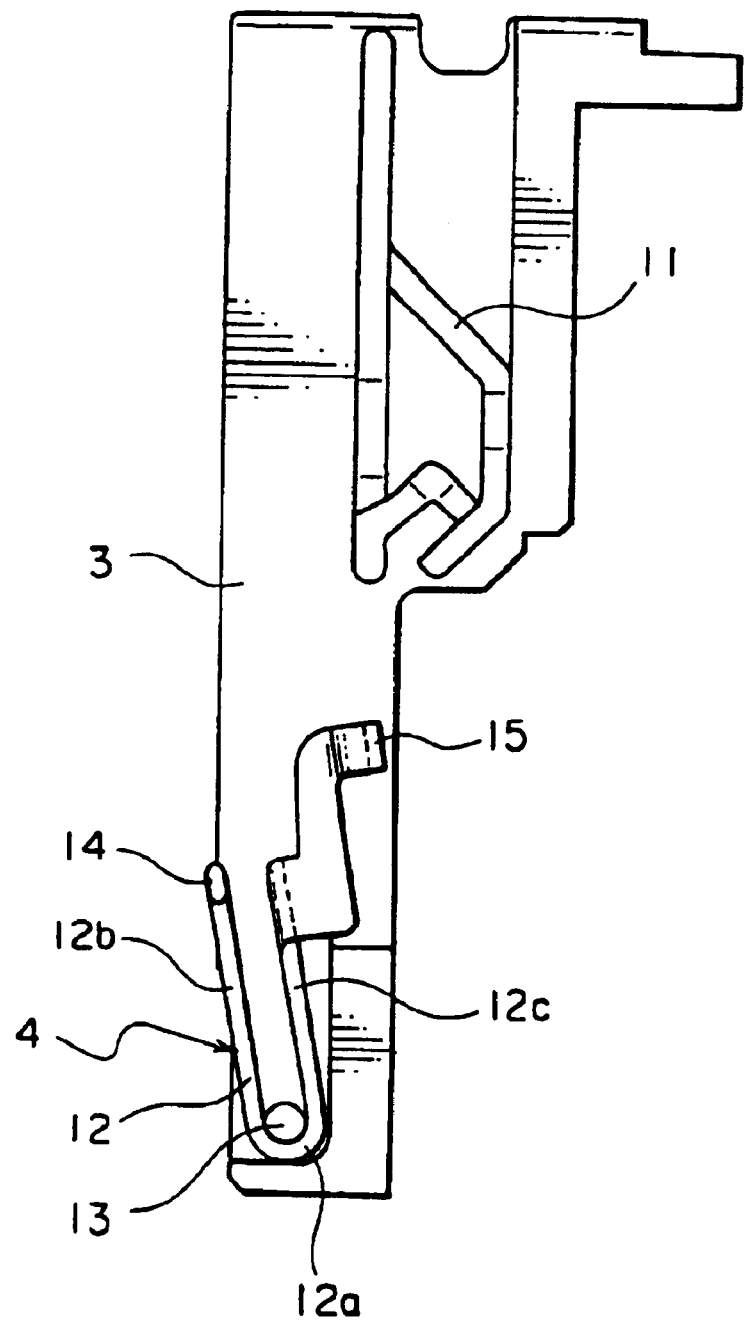
FIG. 4 is a plan view of a combination of an eject lever and a locking member contained in the card connector illustrated in FIG. 1.
Figure 5:
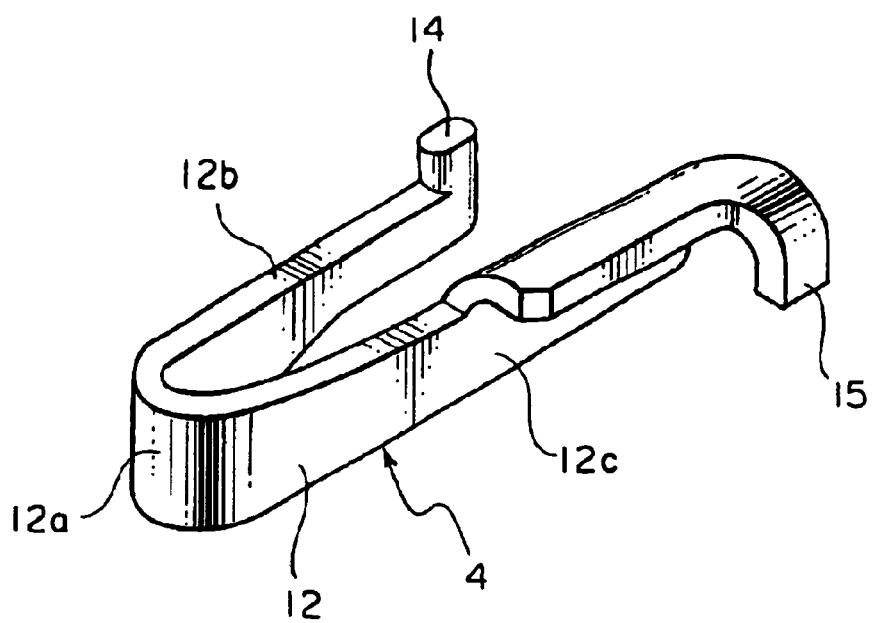
FIG. 5 is an enlarged perspective view of the locking member contained in the card connector illustrated in FIG. 1.

Referring to FIGS. 4 and 5, the eject lever 3 and the locking member 4 will be described.

The eject lever 3 is continuously urged in the first direction A1 by a spring (not shown). The eject lever 3 is provided with a heart cam 11 which is engaged with a cam follower (not shown) fixed to the housing 1.

When the card 10 is inserted from the other end of the housing 1 into the card receiving area 1a, the eject lever 3 slides in the second direction A2 under the pressure of the card 10 and energizes a spring (not shown). Once the card 10 is pushed inward to reach a predetermined position, the eject lever 3 is locked at the predetermined position under the action of the heart cam 11, even if the pressure is released. At this time, the card 10 is electrically connected to the contacts 8.

When the card 10 is pushed slightly further inward, the eject lever 3 is unlocked under the action of the heart cam 11. Consequently, the eject lever 3 is moved in the first direction A1 by the bias of the above-mentioned spring. During the movement, the eject lever 3 separates the card 10 from the contacts 8 and pushes the card 10 out of the card receiving area 1a.

Thus, under the action of the heart cam 11, the eject lever 3 serves as an eject mechanism of a W-PUSH type. The eject mechanism of this type is described in detail in Japanese Patent Application Publication No. 2002-184525 and will not be described herein any further.

The locking member 4 has a generally U-shaped portion 12 which has a U-shaped bottom 12a rotatably engaged with the eject lever 3 by a support shaft 13 fixed to the eject lever 3. The generally U-shaped portion 12 has a first end portion 12b provided with a cam follower 14 and a second end portion 12c provided with a locking portion 15.

The cam follower portion 14 is inserted into and engaged with the cam portion 7 of the cover 6. Therefore, when the eject lever 3 performs a reciprocal sliding movement in the first and the second directions A1 and A2, the locking member 4 performs a swinging movement around the support shaft 13 in accordance with the shape of the cam portion 7.

Following the swinging movement of the locking member 4, the locking portion 15 enters into and exits from the card receiving area 1a If the locking portion 15 protrudes into the card receiving area 1a into which the card 10 is inserted, the locking portion 15 is engaged with a recess 10a at a lateral edge of the card 10 to lock the card 10. When the locking portion 15 is retracted from the card receiving area 1a, the card 10 which has been locked by the locking portion 15 is unlocked so that the card 10 can be released. Thus, the locking portion 15 is moved following the swinging movement of the locking member 4 to selectively lock and unlock the card 10.

Figure 6A:
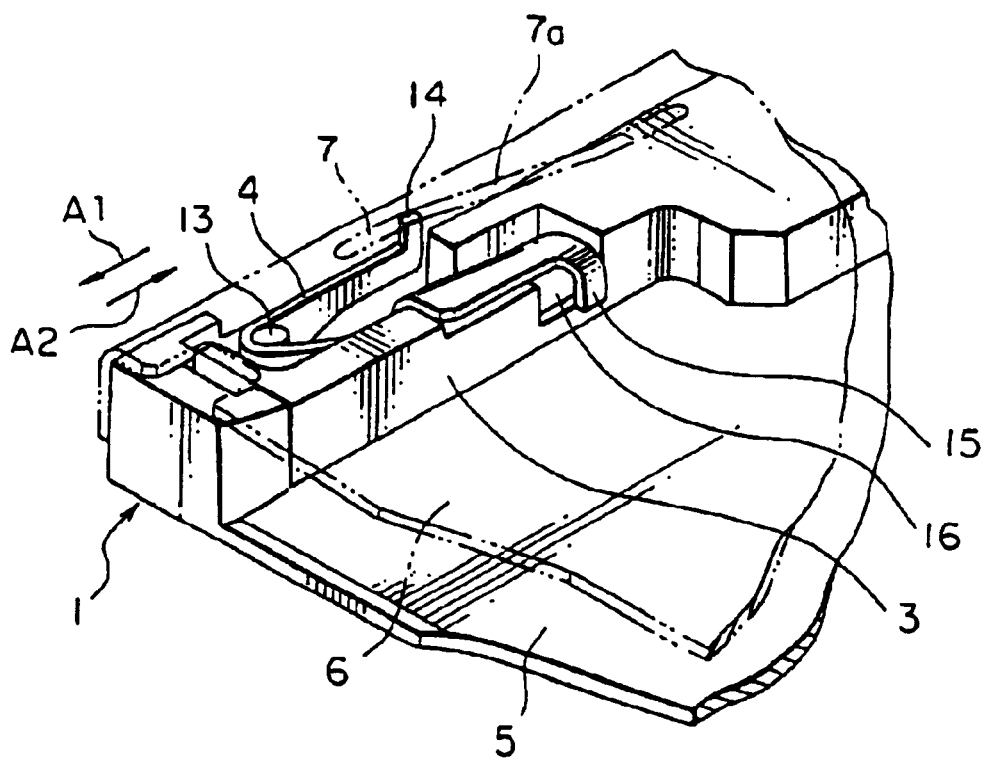
FIG. 6A is a perspective view of the card connector illustrated in FIG. 1, where a card is not inserted, and the cover being depicted in dash-dot lines.
Figure 6B:
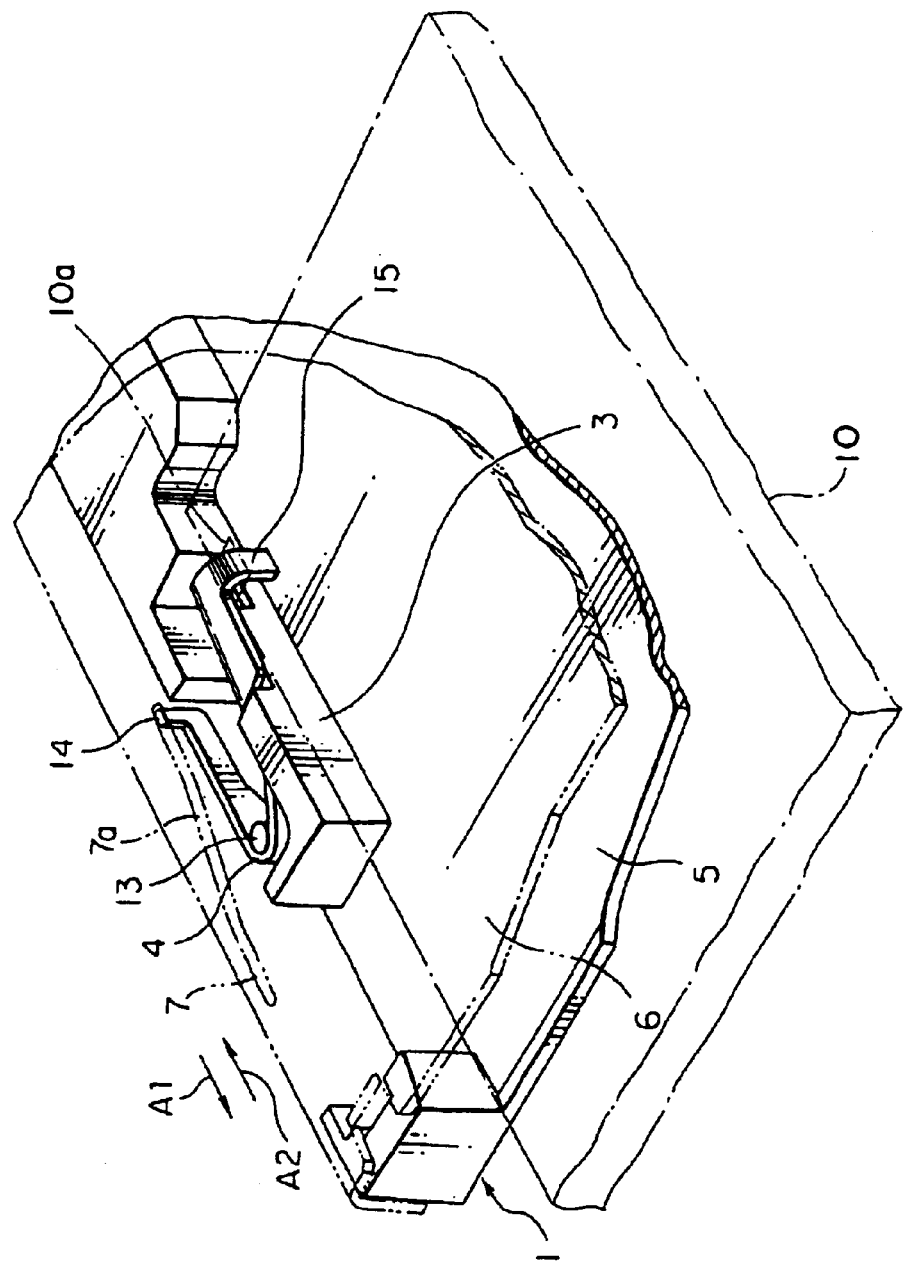
FIG. 6B is a similar perspective view, where the card is inserted.

Referring to FIGS. 6A and 6B, an actual operation of the card connector will be described.

In FIG. 6A, the card 10 is not inserted. In this state, the eject lever 3 is moved in the first direction A1 and the locking portion 15 is retracted from the card receiving area 1a When the card 10 is inserted, the eject lever 3 is pushed by the card to move in the second direction A2. At this time, the cam portion 7 and the cam follower portion 14 cooperate to swing the locking member 4 in one direction.

As a result, the locking portion 15 protrudes into the card receiving area 1a to be engaged with the recess 10a of the card 10, as illustrated in FIG. 6B. If the card 10 is further pushed in, the card 10 is connected to the contacts 8. When the card 10 is connected to the contacts 8, the card 10 is locked by the locking portion 15 to be prevented from being accidentally released.

When the card is further pushed inward, the eject lever 3 is unlocked under the action of the heart cam 11 and is moved in the first direction A1 under the urging force of the spring, as mentioned above. During the movement, the cam portion 7 and the cam follower portion 14 cooperate to swing the locking member 4 in an opposite direction. As a result, the locking portion 15 is retracted from the card receiving area 1a to enter a depression 16 of the eject lever 3, as illustrated in FIG. 6A, so that the card 10 is disengaged from the recess. Therefore, the card 10 is smoothly separated from the contacts 8 and can be ejected from the card receiving area 1a.

As illustrated in FIG. 1, the cover 6 may be provided with a plurality of card brakes 17 for braking the card 10 and a plurality of connection springs 18 for connecting the cover 6 to the hold-downs 9.

This invention has been described in conjunction with a preferred embodiment thereof. However, it will readily be understood by those skilled in the art that this invention is not restricted to the foregoing embodiment but may be modified in various manners with the scope of this invention.

What is claimed is:

1. A card connector for use in connecting a card, the card connector comprising:
   a housing defining a card receiving area and having a cam portion;
   an eject lever slidably held by the housing and adapted to eject the card from the card receiving area;
   a support shaft coupled to the eject lever; and
   a locking member mounted to the eject lever to be swingable around the support shaft, the locking member having a cam follower portion to be engaged with the cam portion and a locking portion for locking the card to inhibit the release of the card, axial movement of the elect lever causing relative movement between the cam portion and cam follower portion to move the locking portion between locking and release positions.

2. The card connector according to claim 1, wherein the cam portion and the cam follower portion cooperate in accordance with sliding movement of the eject lever to swing the locking member around the support shaft.

3. The card connector according to claim 2, wherein the locking portion moves in accordance with swinging movement of the locking member to selectively carry out one of locking and unlocking of the card.

4. The card connector according to claim 1, wherein the locking member has a generally U-shaped portion including:
   a first end portion connected to the cam follower portion;
   a second end portion connected to the locking portion; and
   a U-shaped bottom connected to the first and the second end portions and extending along a periphery of the support shaft.

5. The card connector according to claim 4, wherein the cam portion and the cam follower portion cooperate to swing the generally U-shaped portion around the support shaft, thereby moving the locking portion.

6. The card connector according to claim 1, wherein the housing has a base and a cover fixed to the base, the eject lever being held by the housing, the cam portion being formed on the cover.

7. The card connector according to claim 1, further comprising a conductive contact disposed adjacent to the card receiving area and held by the base for coming into contact with the card.

8. The card connector according to claim 1, wherein the locking portion enters into and exits from the card receiving area in response to sliding movement of the eject lever and in accordance with a shape of the cam portion.

9. The card connector according to claim 1, wherein the eject lever has a heart cam engaged with the housing for controlling sliding movement of the eject lever.

* * * * *